(12) United States Patent
Bang et al.

(10) Patent No.: US 7,742,628 B2
(45) Date of Patent: Jun. 22, 2010

(54) APPARATUS AND METHOD FOR RECOGNIZING SPATIAL WRITING AND RECORDING MEDIUM STORING THE METHOD

(75) Inventors: Won-chul Bang, Seongnam-si (KR); Dong-yoon Kim, Seoul (KR); Jong-koo Oh, Suwon-si (KR); Sung-jung Cho, Suwon-si (KR); Joon-kee Cho, Yongin-si (KR); Eun-seok Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1163 days.

(21) Appl. No.: 11/354,853

(22) Filed: Feb. 16, 2006

(65) Prior Publication Data

US 2006/0182316 A1 Aug. 17, 2006

(30) Foreign Application Priority Data

Feb. 16, 2005 (KR) ...................... 10-2005-0012819

(51) Int. Cl.
*G06K 9/00* (2006.01)
(52) U.S. Cl. ....................................... 382/122; 382/314
(58) Field of Classification Search ................. 382/122, 382/314; 345/179
See application file for complete search history.

(56) References Cited

U.S. PATENT DOCUMENTS

| | | | |
|---|---|---|---|
| 6,592,039 B1 * | 7/2003 | Smith et al. ............. | 235/462.49 |
| 6,625,314 B1 * | 9/2003 | Okamoto .................... | 382/188 |
| 7,023,536 B2 * | 4/2006 | Zhang et al. ................ | 356/138 |
| 2004/0140962 A1 * | 7/2004 | Wang et al. ................. | 345/179 |
| 2006/0267965 A1 * | 11/2006 | Clary .......................... | 345/179 |

FOREIGN PATENT DOCUMENTS

| | | |
|---|---|---|
| JP | 10-187341 A | 7/1998 |
| JP | 2000099251 A | 4/2000 |
| JP | 2004227563 A | 8/2004 |

\* cited by examiner

*Primary Examiner*—Bhavesh M Mehta
*Assistant Examiner*—Stephen R Koziol
(74) *Attorney, Agent, or Firm*—Sughrue Mion, PLLC

(57) ABSTRACT

An apparatus and method for increasing the rate of recognition of spatial writing, the apparatus including an inertia sensor module, a storage module, an operation module, and a recognition module. The inertia sensor module measures acceleration of a spatial writing device. The storage module stores predetermined operation information and parameters for tracing the motion trajectory of spatial writing, and pattern information about the motion trajectory. The operation module calculates a velocity of the spatial writing from the acceleration measured using the operation information and parameters, corrects the calculated motion velocity by limiting positional relationships between predetermined points which correspond to the motion trajectory of the spatial writing, and traces the motion trajectory using the corrected motion velocity. The recognition module recognizes the spatial writing by comparing the motion trajectory of spatial writing traced by the operation module with pattern information about motion trajectories stored in the storage module.

10 Claims, 18 Drawing Sheets

| | rate of recognition | |
| --- | --- | --- |
| | US6,292,751 | the present invention |
| 0 | 97.22 | 97.50 |
| 1 | 95.24 | 95.24 |
| 2 | 96.30 | 97.41 |
| 3 | 92.11 | 97.95 |
| 4 | 98.24 | 95.31 |
| 5 | 97.78 | 98.52 |
| 6 | 92.74 | 96.58 |
| 7 | 95.68 | 96.30 |
| 8 | 78.33 | 90.56 |
| 9 | 97.71 | 99.02 |
| average | 94.14 | 96.44 |

|   | rate of recognition | |
|---|---|---|
|   | US 6,292,751 | the present invention |
| 0 | 92.41 | 96.94 |
| 1 | 89.65 | 93.25 |
| 2 | 90.45 | 84.44 |
| 3 | 86.23 | 95.03 |
| 4 | 92.81 | 93.84 |
| 5 | 93.21 | 96.67 |
| 6 | 87.87 | 94.02 |
| 7 | 90.96 | 96.03 |
| 8 | 73.07 | 86.94 |
| 9 | 92.08 | 97.39 |
| average | 88.87 | 93.46 |

APPARATUS AND METHOD FOR RECOGNIZING SPATIAL WRITING AND RECORDING MEDIUM STORING THE METHOD

CROSS-REFERENCE TO RELATED APPLICATION

This application claims priority from Korean Patent Application No. 10-2005-0012819 filed on Feb. 16, 2005, in the Korean Intellectual Property Office, the disclosure of which is incorporated herein by reference in its entirety.

BACKGROUND OF THE INVENTION

1. Field of the Invention

Apparatuses and methods consistent with the present invention relate to increasing the rate of recognition of spatial writing when recognizing spatial writing using an inertia sensor.

2. Description of the Related Art

Generally, a process of recognizing spatial writing is performed as shown in FIG. 1. That is, in operation S110, a user writes a character in a space using a device for detecting spatial writing, for example, a pen having a function of recognizing spatial writing, and then in operation S120, the angular velocity and acceleration of the spatial writing are measured using an inertia sensor mounted in the pen.

Thereafter, in operation S130, a writing trajectory, that is, a motion trajectory, generated in a space by the motion of the pen, is traced using the measured angular velocity and acceleration, and then in operation S140, the user's writing is recognized through the recognition of the motion trajectory at.

In the above case, the inertia sensor includes an acceleration sensor for measuring acceleration so as to calculate the change in the position of an object, and an angular velocity sensor (or a so-called "gyroscope") for measuring an angular velocity so as to calculate the change in the rotational angle of an object.

However, in the acceleration sensor, inherent error, which is possessed by the acceleration sensor, accumulates during a process of integrating the measured acceleration with respect to time and, as a result, a large difference between a calculated position and an actual position results.

For example, the offset of the acceleration sensor, which is the output of the acceleration sensor when acceleration is applied, must ideally be 0. However, offset is caused by slight error due to the physical limitations in implementing the acceleration sensor, and varies slightly with time or temperature. The slowly varying offset value of the acceleration sensor is called drift.

Since the drift of the acceleration offset is influenced even when acceleration is applied, it is not easy to exactly distinguish the portions of the output of the acceleration sensor that are influenced by the drift and by the acceleration from each other.

FIGS. 2A, 2B, 2C, 2D, 2E, 2F, and 2G are graphs illustrating a motion trajectory in the case where the above-described drift does not exist. FIG. 2A shows a counterclockwise motion trajectory that is formed along a rectangular path with respect to x-y spatial coordinates.

Furthermore, FIGS. 2B and 2C show graphs illustrating the change in position with time for an x-axis and a y-axis, respectively, FIGS. 2D and 2E show graphs illustrating the variation in velocity with time for an x-axis and a y-axis, respectively, and FIGS. 2F and 2G show graphs illustrating the variation in acceleration with time for an x-axis and a y-axis, respectively.

FIGS. 3A, 3B, 3C, 3D, 3E, 3F and 3G are graphs illustrating a motion trajectory in the case where drift exists. FIG. 3A shows a clockwise motion trajectory that is formed along a rectangular path with respect to x-y spatial coordinates.

Furthermore, FIGS. 3B and 3C show graphs illustrating the change in position with time for an x-axis and a y-axis, respectively, FIGS. 3D and 3E show graphs illustrating the variation in velocity with time for an x-axis and a y-axis, respectively, and FIGS. 3F and 3G show graphs illustrating the variation in acceleration with time for an x-axis and a y-axis, respectively. In the examples shown in FIGS. 3A, 3B, 3C, 3D, 3E, 3F and 3G, it is assumed that the drift is $$0.01 \text{m}/\text{sec}^2 \left( \cong \frac{1}{1000}G \right).$$

Comparing FIGS. 2F and 2G with FIGS. 3F and 3G, there is almost no difference therebetween. In contrast, comparing FIGS. 2D and 2E with FIGS. 3D and 3E, each of which was integrated once, it can be seen that a slight difference exists therebetween in a one-to-two second interval with respect to an x-axis and in a two-to-three second interval with respect to a y-axis. Furthermore, comparing FIGS. 2B and 2C with FIGS. 3B and 3C, each of which was integrated twice, it can be seen that the difference therebetween is larger. That is, it can be seen that a large error occurs due to the existence of the drift when integration is performed twice so as to obtain a position from the acceleration.

FIG. 4A is another graph comparing a motion trajectory obtained in the case where drift exists with a motion trajectory obtained in the case where no drift exists. For example, the numeral "2" is drawn in a space, and a large difference occurs between the case where drift exists and the case where drift does not exist. In FIGS. 4B, 4C and 4D, the motion trajectory shown in FIG. 4A is divided on the basis of an x-axis, a y-axis, and a z-axis, respectively, and resulting motion trajectories are compared with each other. In FIGS. 4B, 4C and 4D, the motion trajectories where drift exists are labeled "A" and the motion trajectories where drift does not exist are labeled "B."

As discussed above, numerous error occurs due to factors such as drift in the case where a motion trajectory is traced using the inertia sensor.

Accordingly, in order to minimize the error, a conventional method detects whether the velocity of a moving object is "0", and corrects the integral value of acceleration "0" whenever the velocity is 0, thereby tracing the changing position of the object. This conventional method is shown in FIG. 5A. For example, in a graph shown in FIG. 5A, which results from the integration of the acceleration measured by the inertia sensor, the integral value of the acceleration is corrected "0" at time T when it is detected at time T that the velocity of a moving object is "0" using a predetermined method.

There is another conventional method that has been disclosed in U.S. Pat. No. 6,292,751 entitled "Positioning Refinement Algorithm." In this method, it is detected that the velocity of a moving object is "0" using a predetermined method, and a linear equation is subtracted from a velocity curve with respect to the entire time interval so that the integral value of acceleration is "0" whenever the velocity is 0, thereby tracing the changing position of the object. This conventional method is shown in FIG. 5B. If it is detected that the velocity of a moving object is "0" at time T, a predetermined linear equation is subtracted from a velocity curve before correction for the entire time ranging from 0 to T and, therefore, a corrected velocity curve can be obtained.

The above-described methods correct velocity or acceleration using information about velocity that is "0." In such a case, the fact that the velocity is "0" implies that there is no motion along any axis. That is, the above-described methods perform correction only when the velocity is "0" with respect to all axes, so that substantial error can accumulate.

As a result, when, for example, a user conducts writing in a space, it is difficult to recognize the writing due to the accumulated error. Moreover, conventionally, in order to perform a correction a condition in which a pause must necessarily occur before or after a writing operation is required. For example, such a condition may be fulfilled in such a manner that a pen is attached to a button and the start and end of a writing operation is indicated using the button.

Accordingly, it is necessary to improve the rate of recognition of spatial writing and recognize the spatial writing without a pause before or after a writing operation.

SUMMARY OF THE INVENTION

An aspect of the present invention provides a method capable of recognizing spatial writing without a pause before or after a writing operation, and improving the rate of recognition of spatial writing by limiting positional relationships between predetermined points constituting the motion trajectory of the spatial writing and, thereby, correcting the velocity of the spatial writing.

According to another aspect of the present invention there is provided a method of recognizing spatial writing, the method including the steps of measuring the acceleration of a device for performing spatial writing; calculating motion velocity of the device using the measured acceleration, and correcting the calculated motion velocity by limiting positional relationships between predetermined points constituting the motion trajectory of the spatial writing; tracing the motion trajectory using the corrected motion velocity, and recognizing a traced motion trajectory.

According to another aspect of the present invention there is provided an apparatus for recognizing spatial writing, the apparatus comprising a spatial writing recognition module, wherein the spatial writing recognition module includes an inertia sensor module for measung acceleration of motion in a space; a storage module for storing predetermined operation information and parameters for tracing the motion trajectory of spatial writing, and pattern information about the motion trajectory, an operation module for calculating the motion velocity of the spatial writing from the acceleration measured using the operation information and parameters, correcting the calculated motion velocity by limiting positional relationships between predetermined points constituting the motion trajectory of the spatial writing, and tracing the motion trajectory using the corrected motion velocity, and a recognition module for recognizing the spatial writing by comparing the motion trajectory of spatial writing traced by the operation module with pattern information about motion trajectories stored in the storage module.

BRIEF DESCRIPTION OF THE DRAWINGS

The above and other aspects of the present invention will become more apparent by describing in detail exemplary embodiments thereof with reference to the accompanying drawings, in which.

DESCRIPTION OF EXEMPLARY EMBODIMENTS OF THE PRESENT INVENTION

Figure 1:
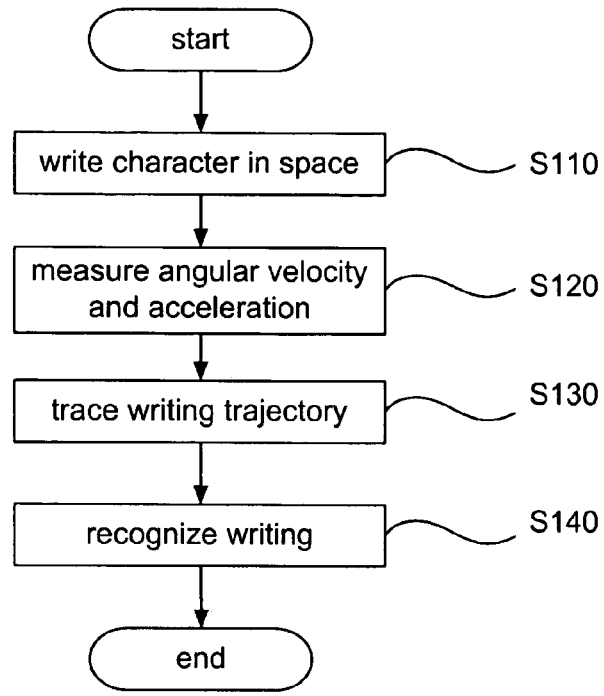
FIG. 1 is a flowchart illustrating a conventional method of recognizing spatial writing.
Figure 2A:
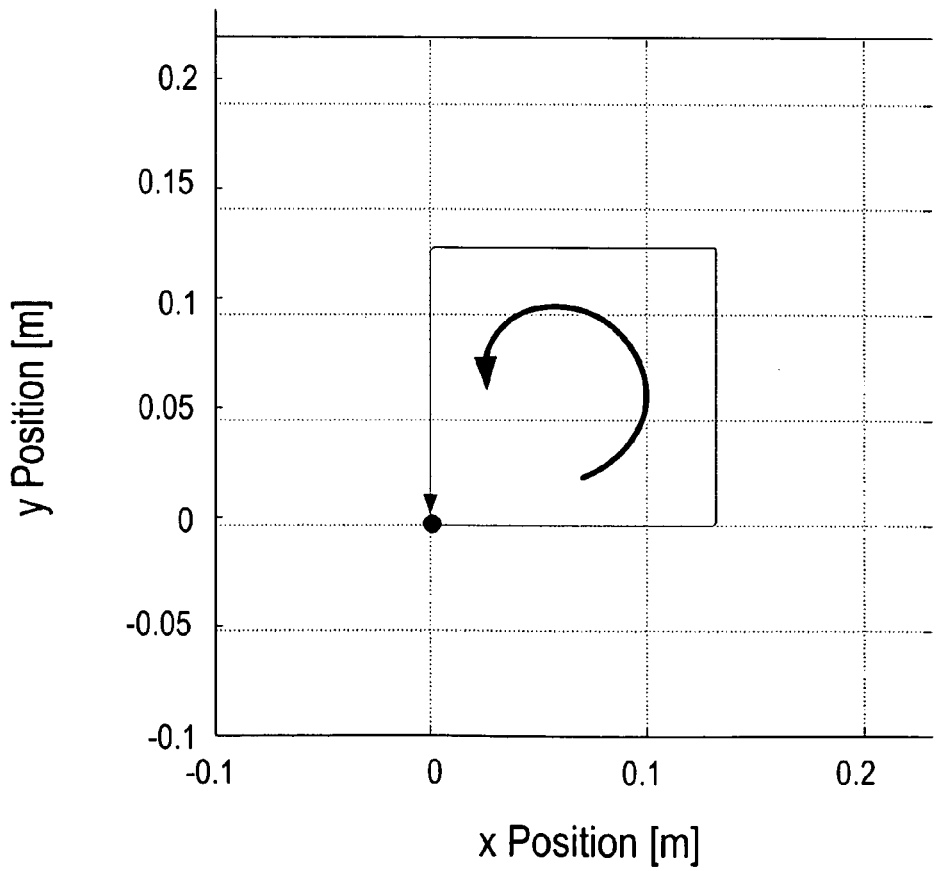
FIGS. 2A, 2B, 2C, 2D, 2E, 2F and 2G are graphs illustrating a motion trajectory in the case where no drift exists.
Figure 2B:
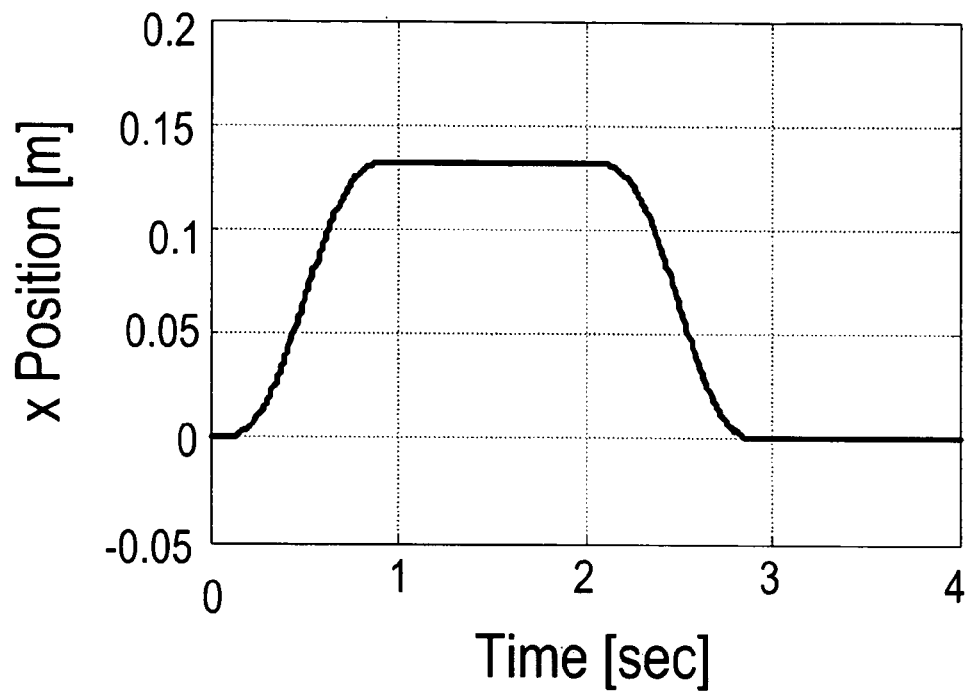
Figure 2C:
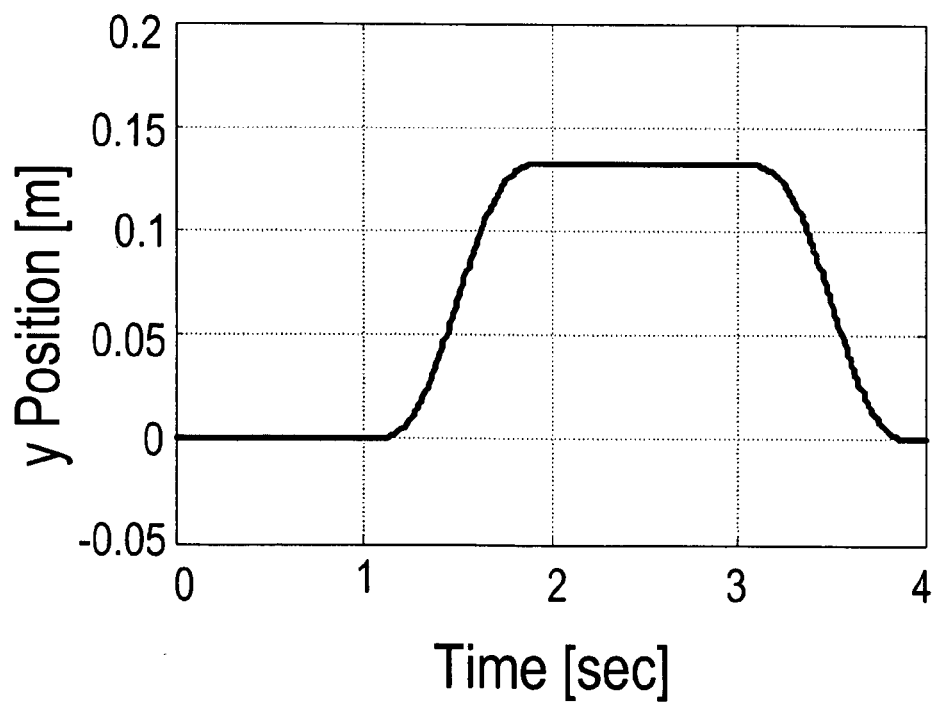
Figure 2D:
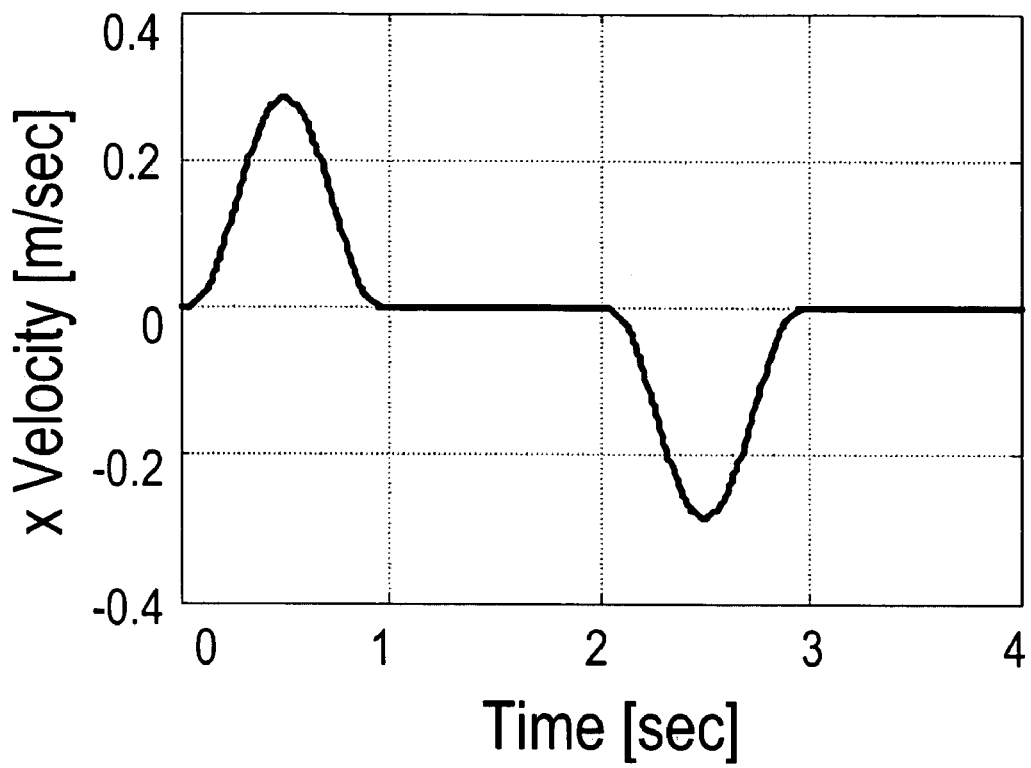
Figure 2E:
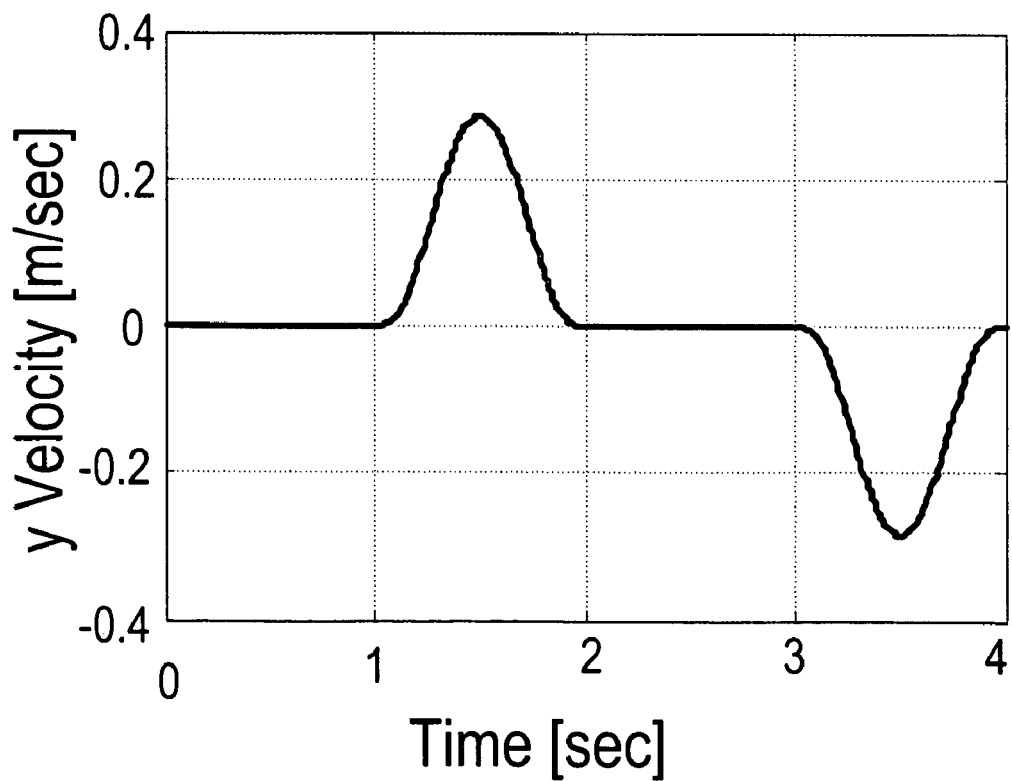
Figure 2F:
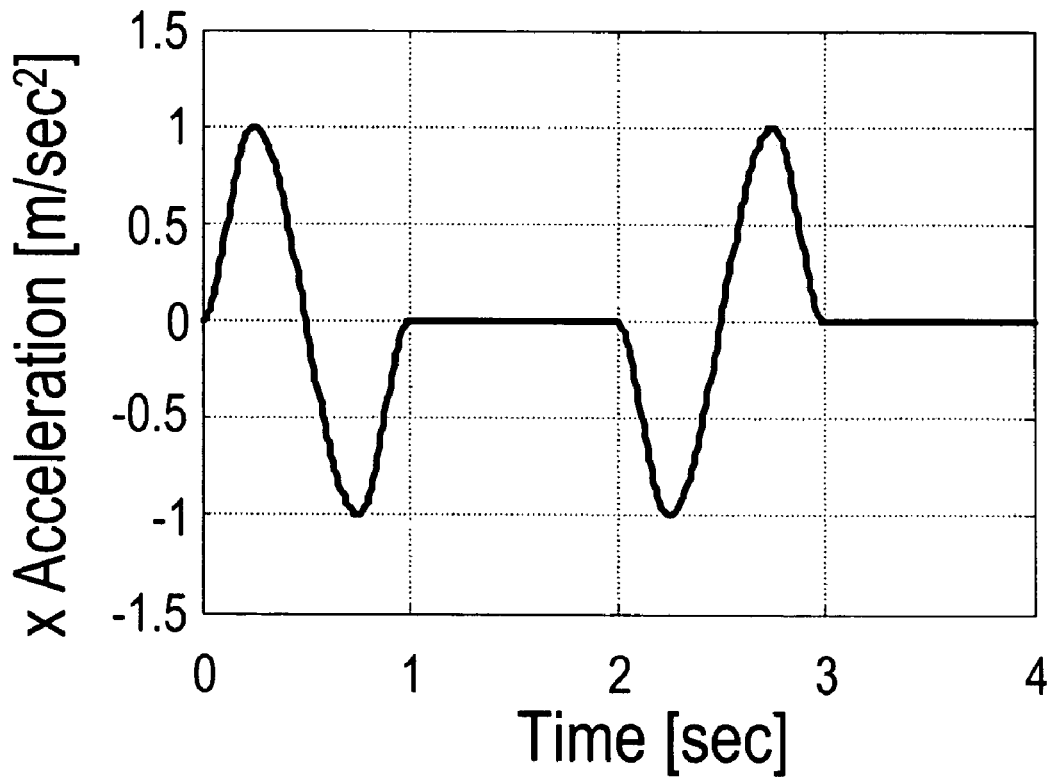
Figure 2G:
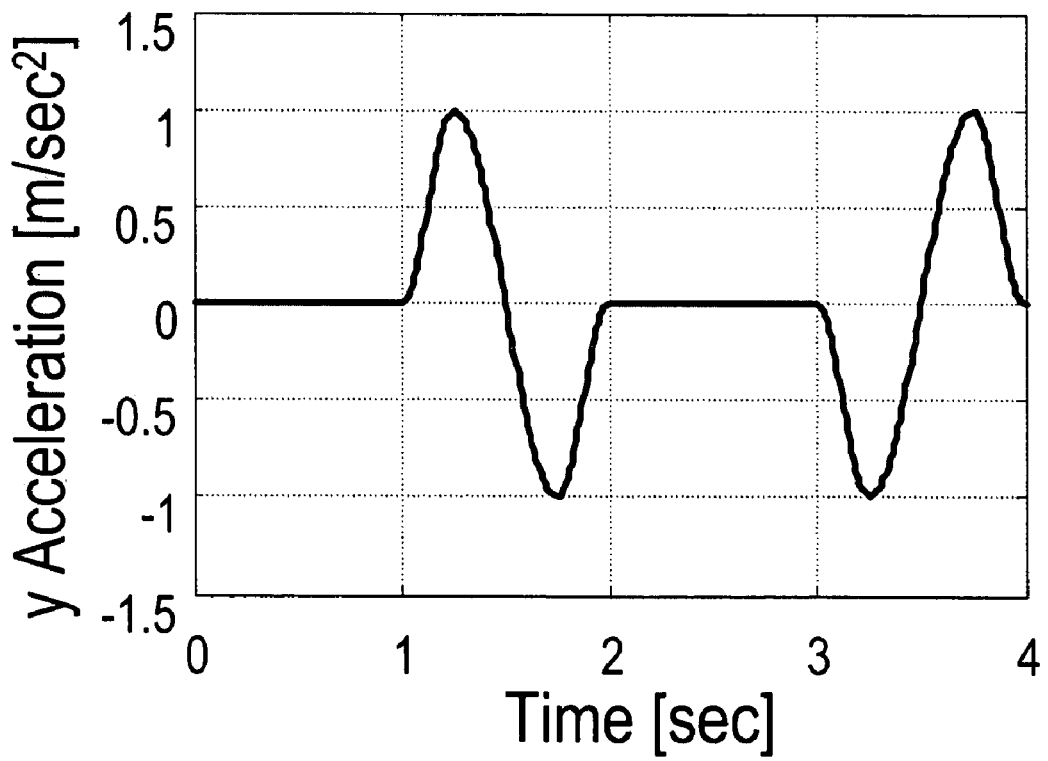
Figure 3A:
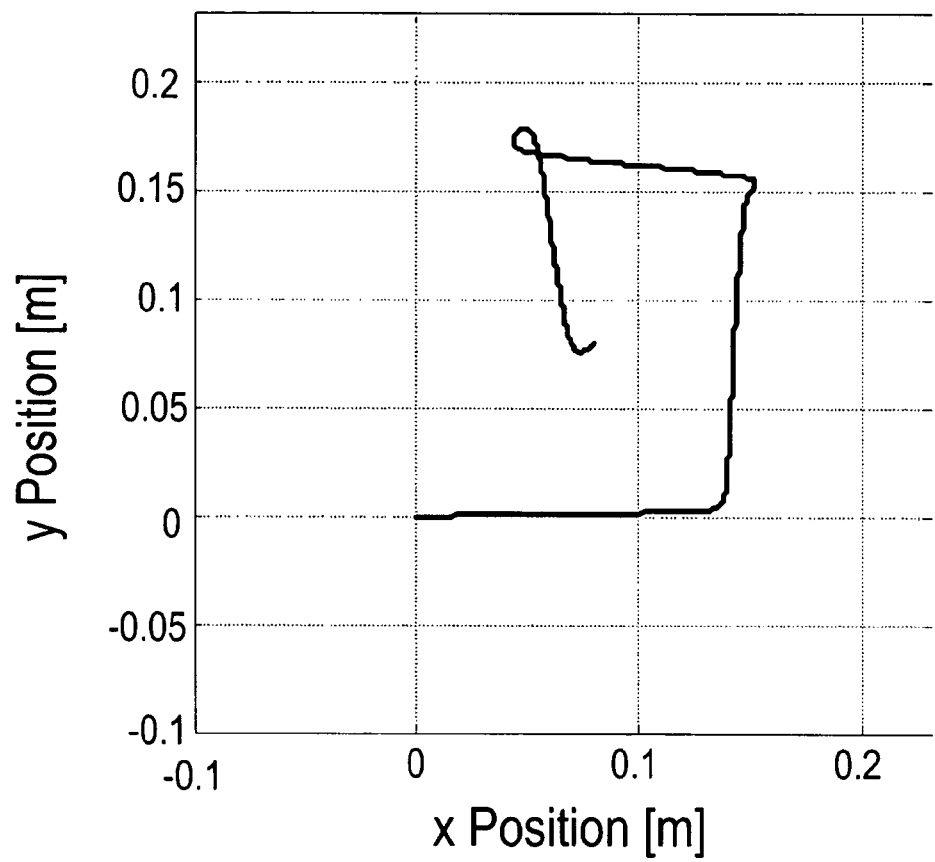
FIGS. 3A, 3B, 3C, D, 3E, 3F and 3G are graphs illustrating a motion trajectory in the case where drift exists.
Figure 3B:
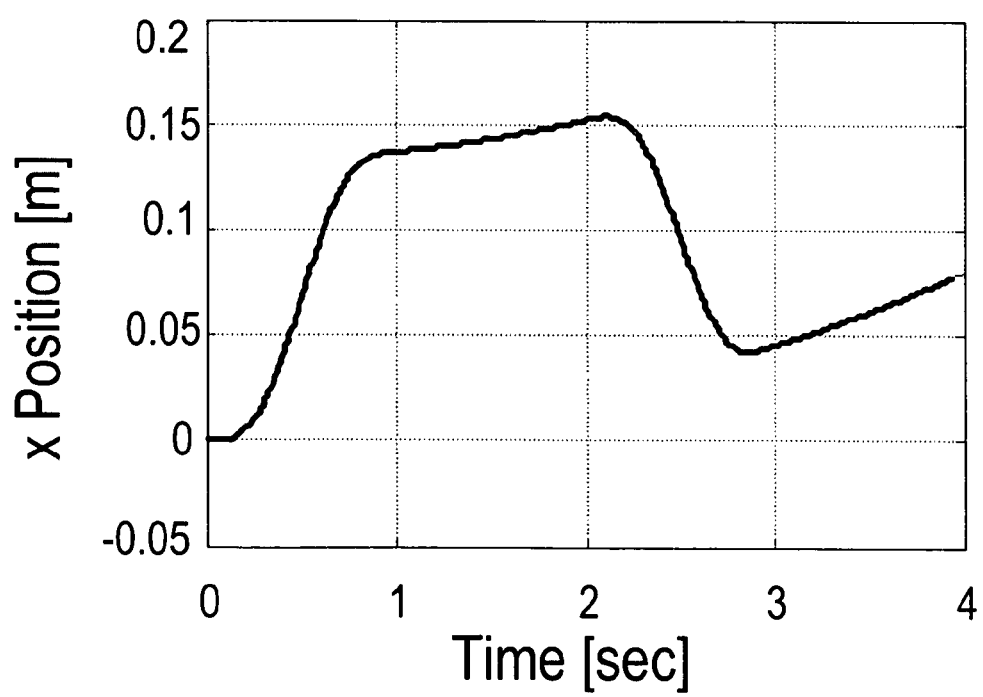
Figure 3C:
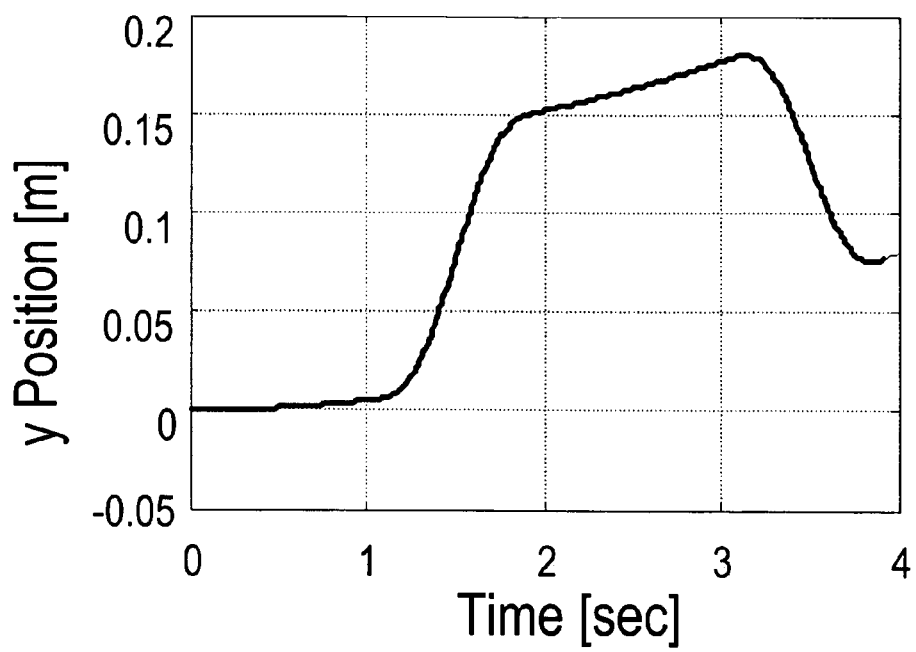
Figure 3D:
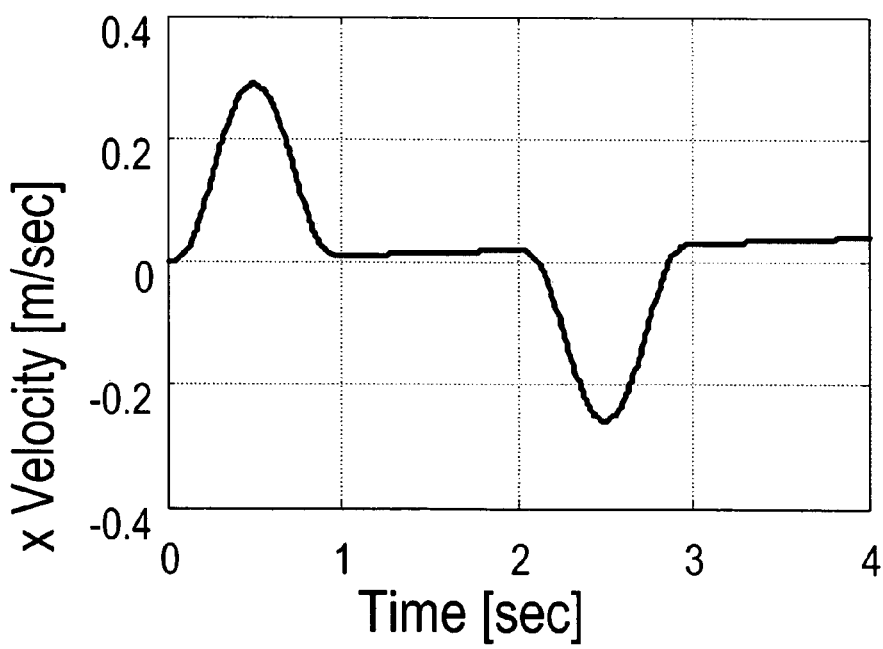
Figure 3E:
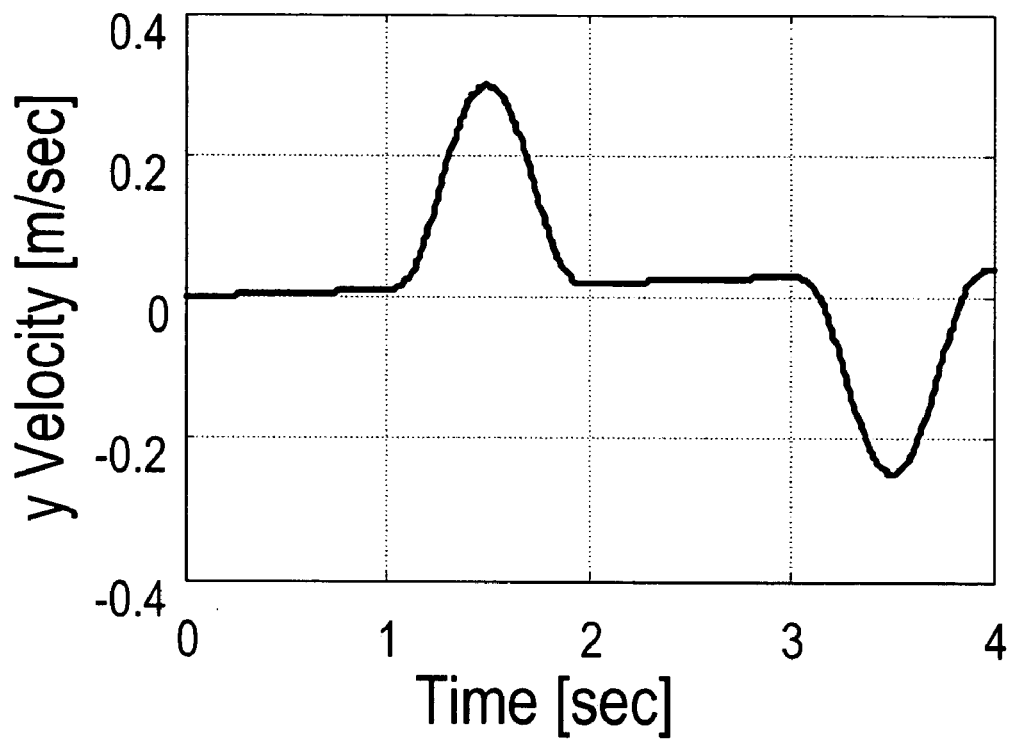
Figure 3F:
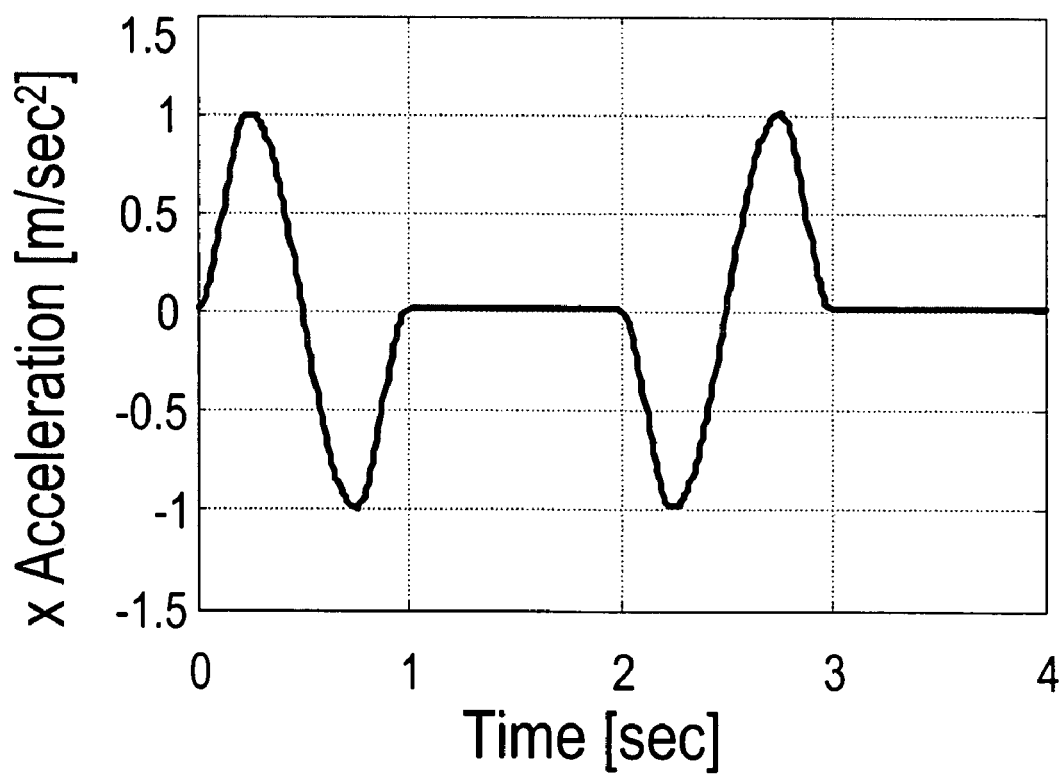
Figure 3G:
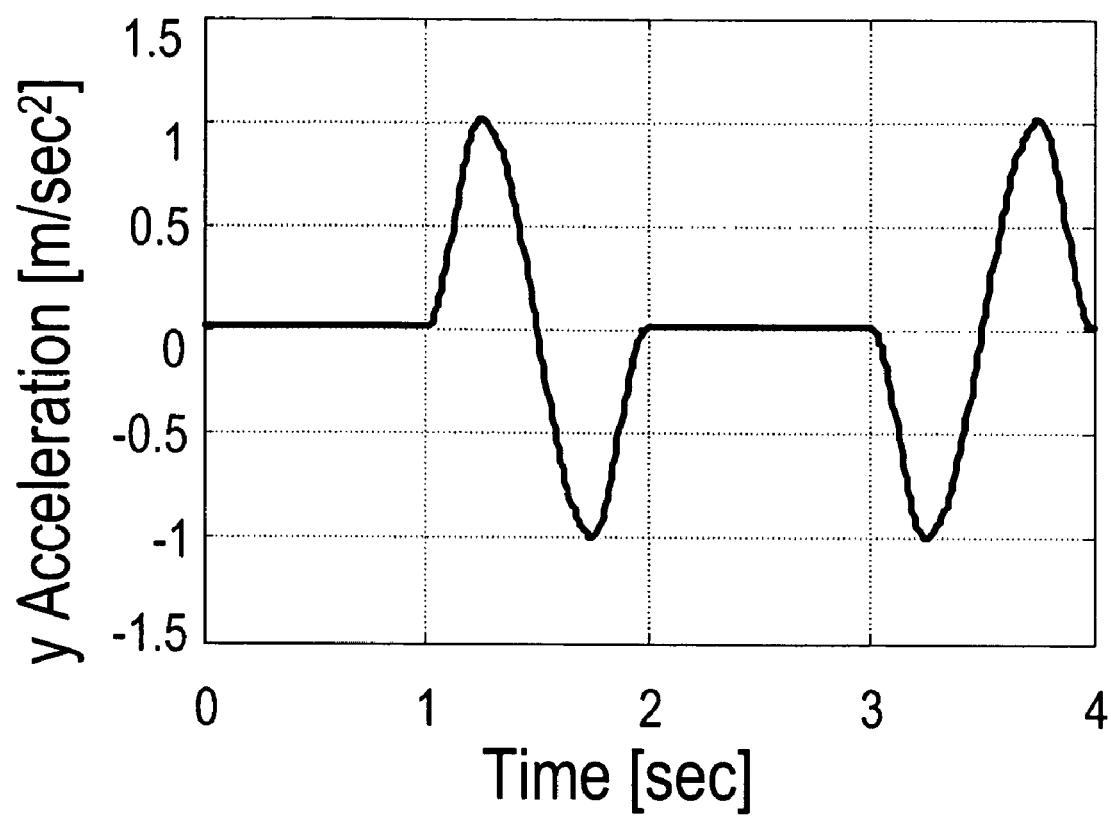
Figure 4A:
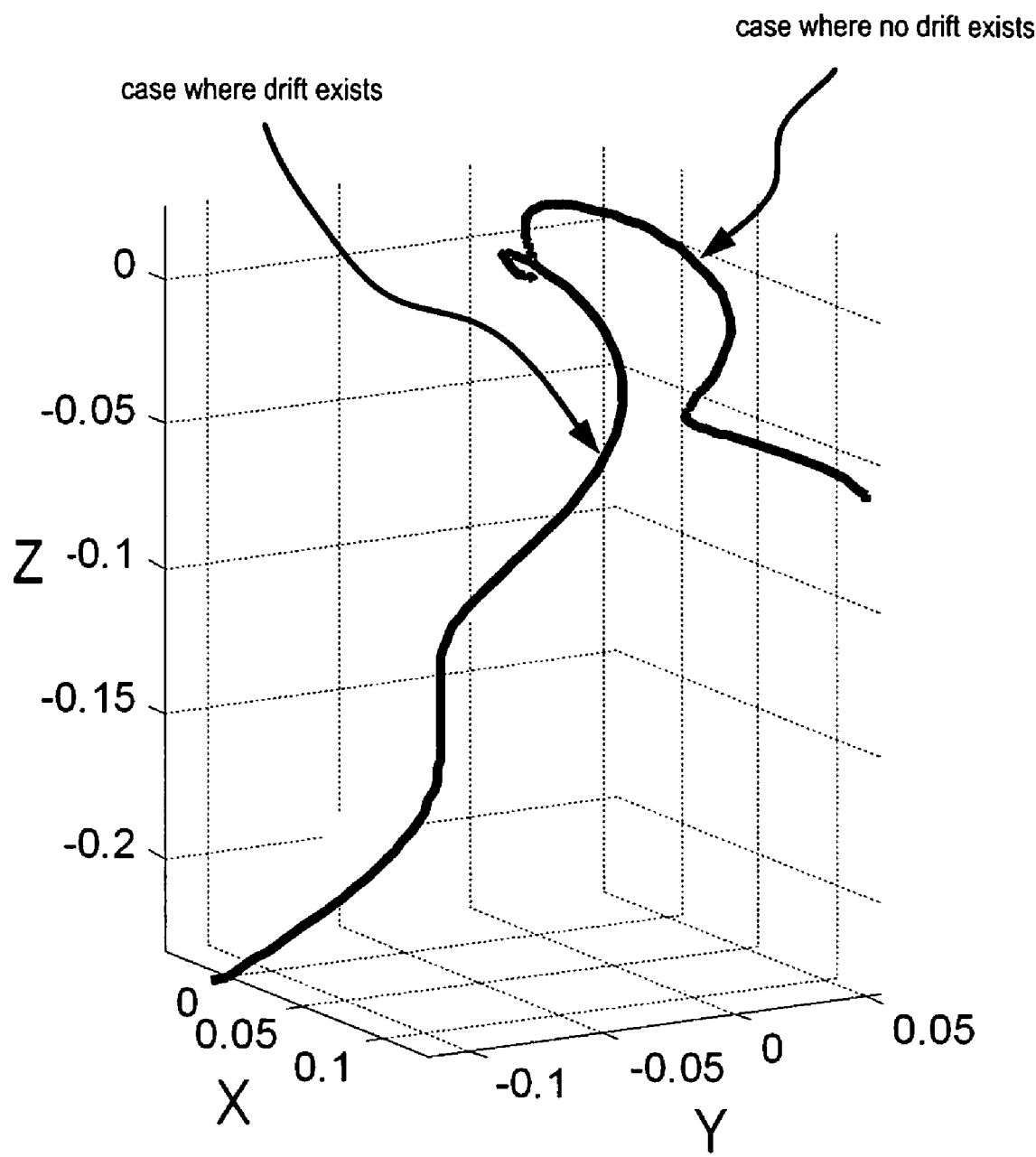
FIGS. 4A, 4B, 4C and 4D are graphs comparing a motion trajectory obtained in the case where no drift exists with a motion trajectory obtained in the case where drift exists.
Figure 4B:
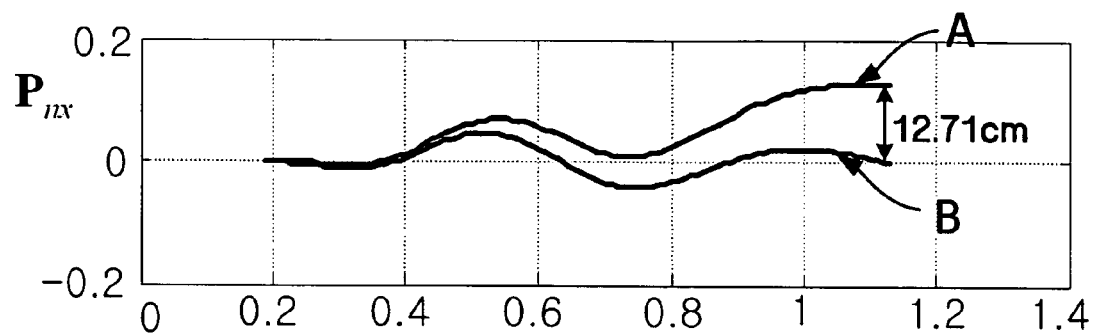
Figure 4C:
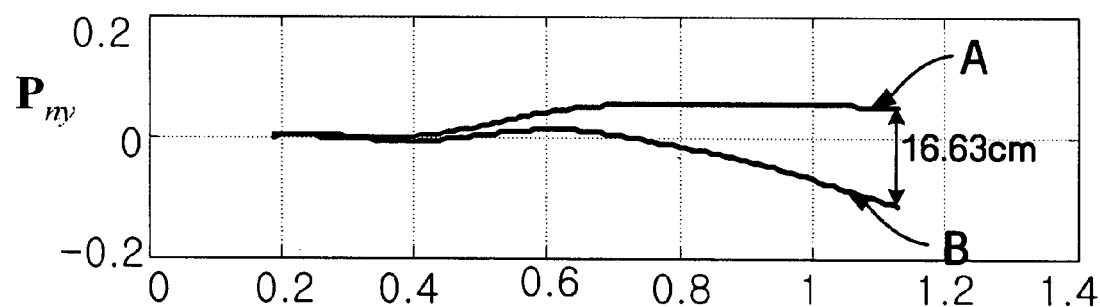
Figure 4D:
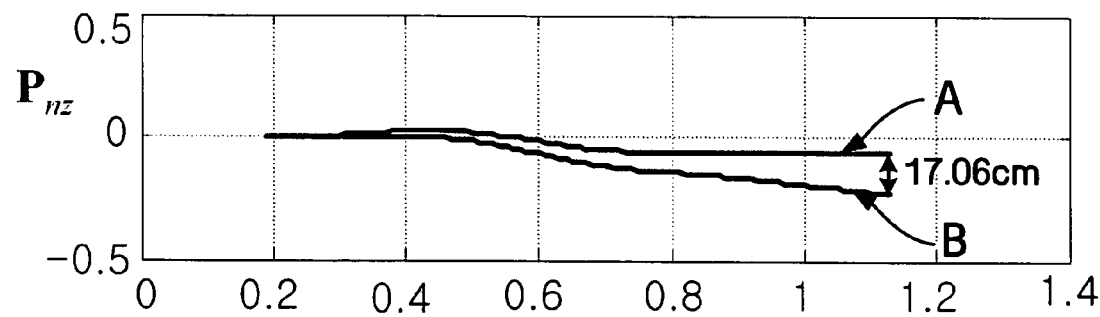
Figure 5A:
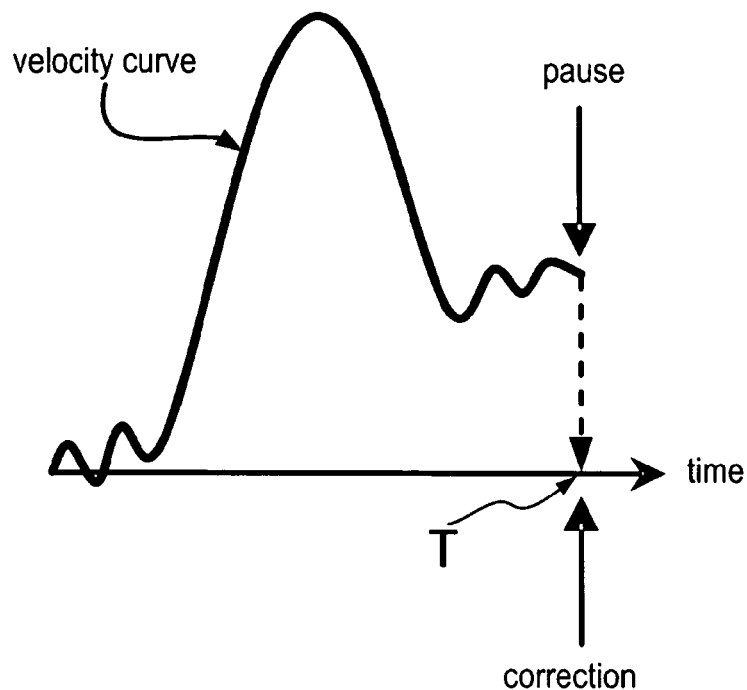
FIG. 5A is a diagram illustrating a conventional method of correcting error generated when a position is traced using an inertia sensor.
Figure 5B:
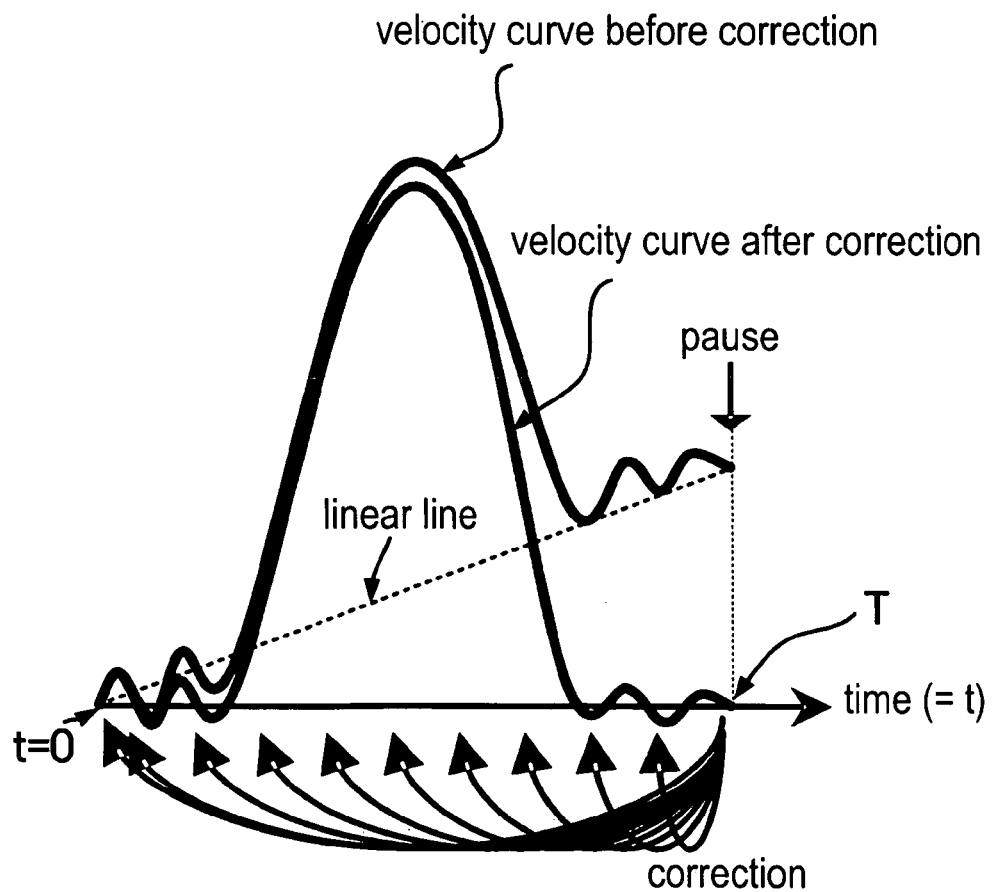
FIG. 5B is a diagram illustrating another conventional method of correcting error generated when a position is traced using an inertia sensor.

The aspects of the present invention, and a method of achieving them will become apparent with reference to exemplary embodiments thereof described in detail below with reference to the accompanying drawings. The same reference numerals are used throughout the different drawings to designate the same or similar components.

Aspects of the present invention is described hereinafter with reference to flowchart illustrations of user interfaces, methods, and computer program products according to exemplary embodiments of the invention. It will be readily understood by one of ordinary skill in the art that each block of the flowchart illustrations, and combinations of blocks in the flowchart illustrations, can be implemented by computer program insructions. These computer program instructions can be provided to a processor of a general-purpose computer, a special-purpose computer, or other programmable data processing apparatus to produce a machine, such that the instructions, which are executed in the processor of the computer or other programmable data processing apparatus, create a means for implementing the functions specified in the flowchart block or blocks.

These computer program instructions may also be stored in a computer-usable or computer-readable memory or medium that can direct a computer or other programmable data processing apparatus to function in a particular manner, such that the instructions stored in the computer-usable or computer-readable memory or medium produce a product that includes an instruction means that implements the functions specified in the flowchart block or blocks.

The computer program instructions may also be loaded onto a computer or other programmable data processing apparatus to cause a series of operation steps to be performed on the computer or other programmable apparatus to produce a computer-implemented process so that the instructions that are executed on the computer or other programmable apparatus provide operations for implementing the functions specified in the flowchart block or blocks.

Furthermore, each block of the flowchart illustrations may represent a module, segment, or portion of code, which comprises one or more executable instructions for implementing the specified logical function(s). It should also be noted that in some alternative implementations, the functions noted in the blocks may occur in a different order. For example, two blocks shown in succession may in fact be executed concurrently or may sometimes be executed in reverse order, depending upon the desired functionality.

Figure 6:
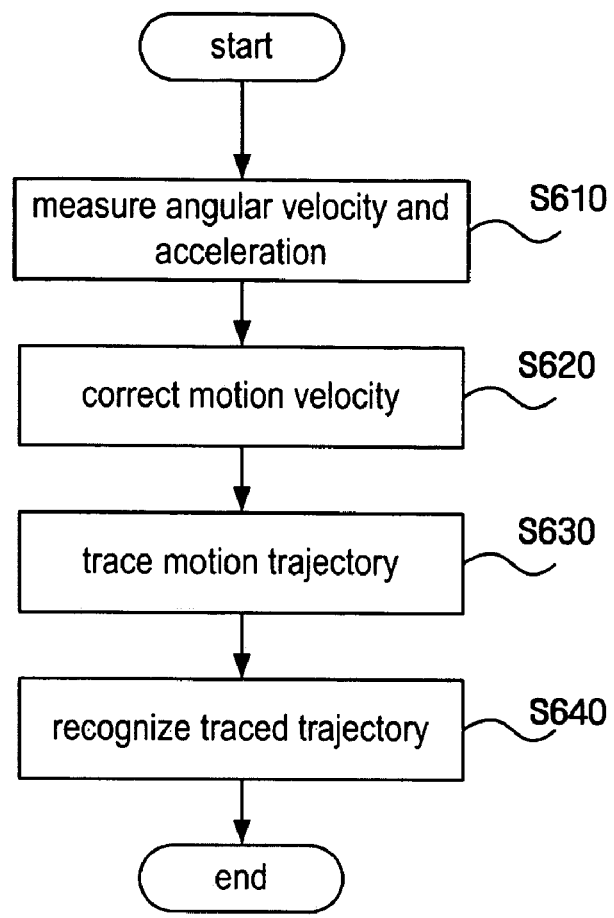
FIG. 6 is a flowchart illustrating a method of recognizing the motion trajectory of spatial writing according to an exemplary embodiment of the present invention.

FIG. 6 is a flowchart illustrating a method of recognizing the motion trajectory of spatial writing according to an exemplary embodiment of the present invention.

When a character is written in a space using a device for detecting a user's spatial writing, for example, a pen having a function of recognizing spatial writing, the angular velocity and acceleration of the spatial writing are measured using an inertia sensor mounted in the pen, at operation S610.

Motion velocity v(t) can be calculated using the measured acceleration. In this case, the calculated motion velocity can be corrected by limiting positional relationships between predetermined points constituting the motion trajectory of the spatial writing.

In an exemplary embodiment of the present invention, assuming that a correction is performed by removing a linear component, which passes through the origin, from the motion velocity, corrected motion velocity $v^c(t)$ can be expressed by the following Equation 1:

$$v^c(t)=v(t)-\alpha t \quad (1)$$

In this case, assuming that the end point of the motion trajectory of spatial writing coincides with the start point thereof, $\alpha$ can be obtained as follows:

$$p^c(t_2) = p^c(t_1), \quad v^c(t) = v(t) - \alpha t$$

$$p^c(t_2) - p^c(t_1) = \int_{t_1}^{t_2} \{v(t) - \alpha t\} dt = 0$$

$$\therefore \alpha = \frac{\int_{t_2}^{t_1} v(t) dt}{\int_{t_1}^{t_2} t dt}$$

where $p^c(t)$ is a position at time t, and $t_1$ and $t_2$ indicate a time at the start point of the motion trajectory and a time at the end points of the motion trajectory, respectively. Since $\alpha$ is obtained, the corrected motion velocity can be calculated using Equation 1.

An exemplary method of correcting the motion velocity by limiting positional relationships between predetemined points constituting the motion trajectory of spatial writing is described below.

Assuming that a correction is performed by removing a predetermined linear component from the motion velocity, corrected motion velocity $v^c(t)$ can be expressed by the following Equation 2:

$$v^c(t)=v(t)-\alpha t-\beta \quad (2)$$

In this case, assuming that a point in the motion trajectory of spatial writing at time t1 is spaced apart from a point in the motion trajectory of spatial writing at time 2 by γ, γ can be expressed as follows:

$$p^c(t_2)-p^c(t_1)=\int_{c1}^{c2}\{v(t)-\alpha t-\beta\}dt=\gamma$$

In the case where β and γ are set to specific values, α can be expressed as follows:

$$\alpha = \frac{\int_{t_1}^{t_2}\{v(t)-\beta\}dt-\gamma}{\int_{t_1}^{t_2}tdt}$$

In the case where α and γ are set to specific values, β can be expressed as follows:

$$\beta = \frac{\int_{t_1}^{t_2}\{v(t)-\alpha t\}dt-\gamma}{t_2-t_1}$$

Since, in both cases, both of α and β are determined, corrected motion velocity $v^c(t)$ can be corrected using Equation 2 at operation S620.

When motion velocity is corrected at operation 620, the corrected motion velocity $v^c(t)$ is integrated as indicated by the following Equation 3 and, therefore, the motion trajectory of spatial writing is traced at operation S630.

$$p^c(t)=\int_{c1}^{c2}v^c(t)dt \quad (3)$$

where all of $v^c(t)$ and $p^c(t)$ may be regarded as vectors including information associated with 2 axes or 3 axes.

The traced motion trajectory is classified as one of a set of characters or symbols defined in advance, using a character recognizer. According to the exemplary embodiment under discussion, a conventional character recognition program is used as the character recognizer at operation S640.

FIGS. 7A, 7B, 7C, 7D, 7E and 7F are graphs showing experimental results according to an exemplary embodiment of the present invention.

Figure 7A:
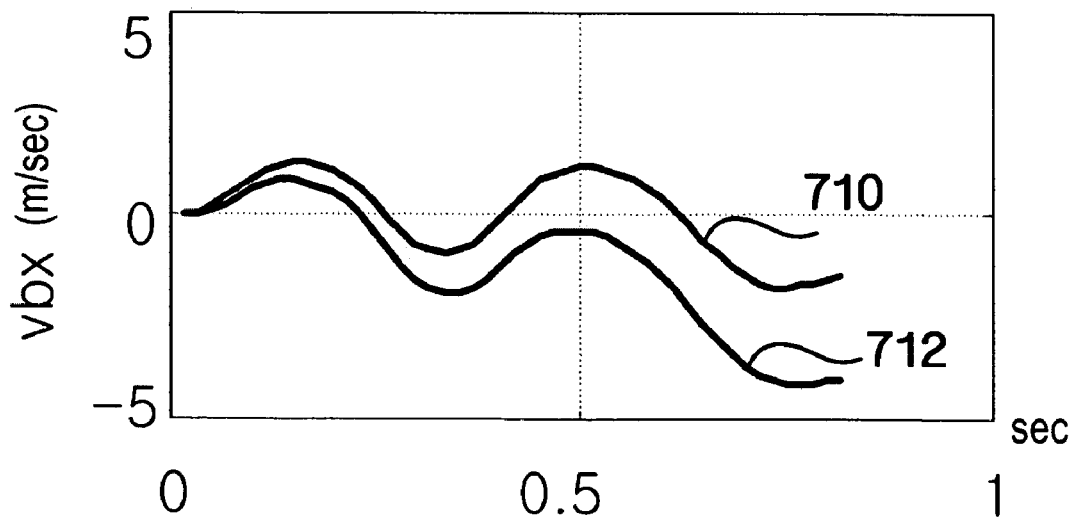
FIGS. 7A, 7B, 7C, 7D, 7E and 7F are graphs showing experimental results according to an exemplary embodiment of the present invention.
Figure 7B:
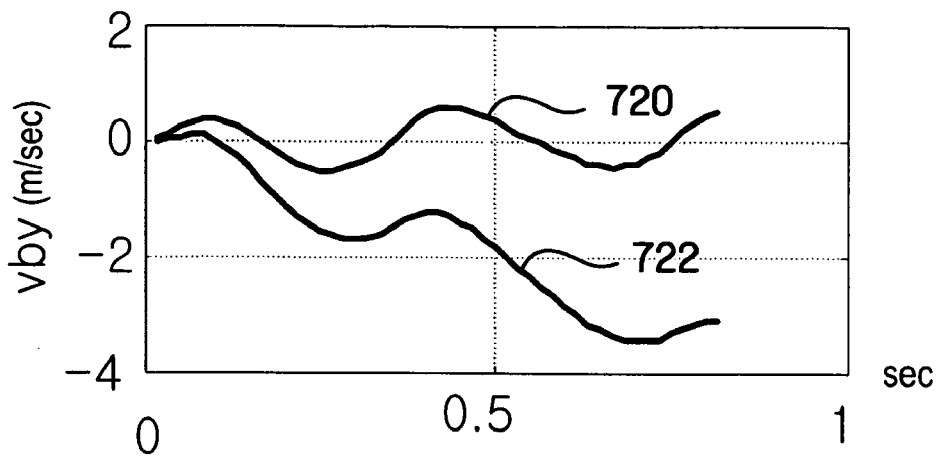

FIGS. 7A and 7B show graphs comparing the cases 712 and 722, where motion velocity is not corrected, with the cases 710 and 720, where motion velocity is corrected according to an exemplary embodiment of the present invention. In this case, a FIG. 7A indicates motion velocity with respect to an x-axis, and FIG. 7B indicates motion velocity with respect to a y-axis.

Figure 7C:
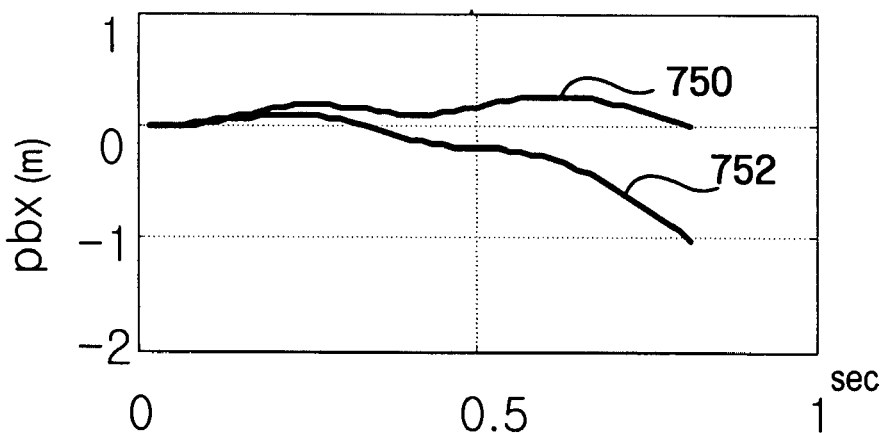
Figure 7D:
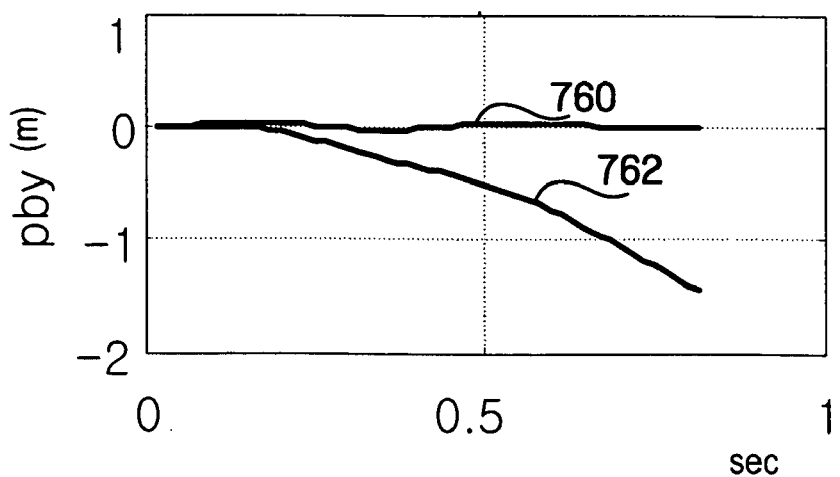

FIGS. 7C and 7D show graphs comparing the cases 752 and 762, where motion velocity is not corrected, with the cases 750 and 760, where motion velocity is corrected, according to an exemplary embodiment of the present invention with respect to the positions of spatial writing. In this case, a FIG. 7C indicates the positions of spatial writing with respect to an x-axis, and FIG. 7D indicates the position of spatial writing with respect to a y-axis.

Figure 7E:
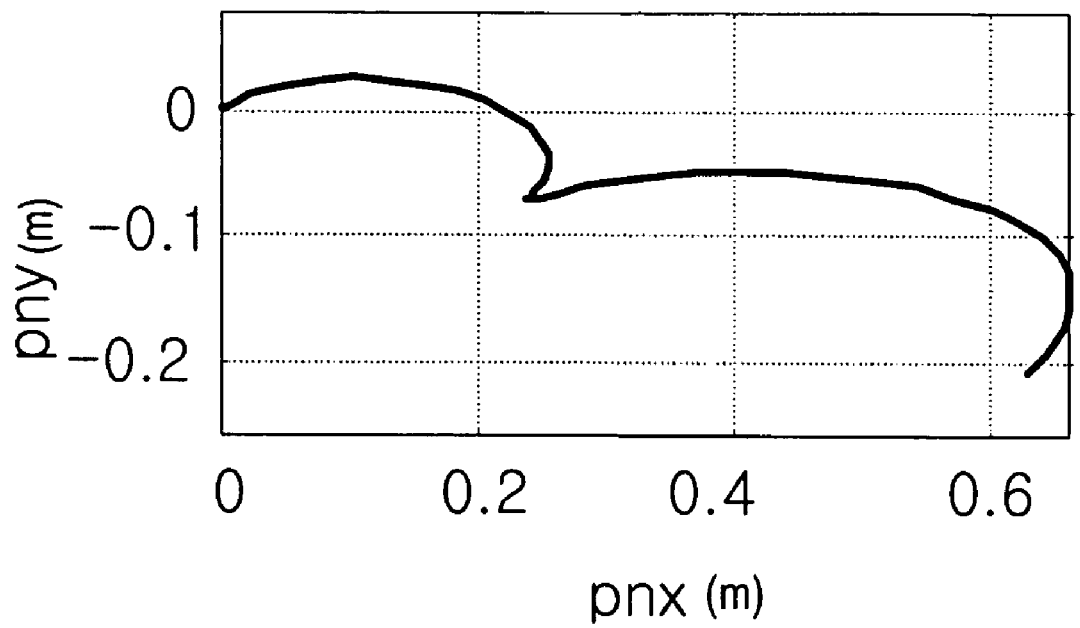
Figure 7F:
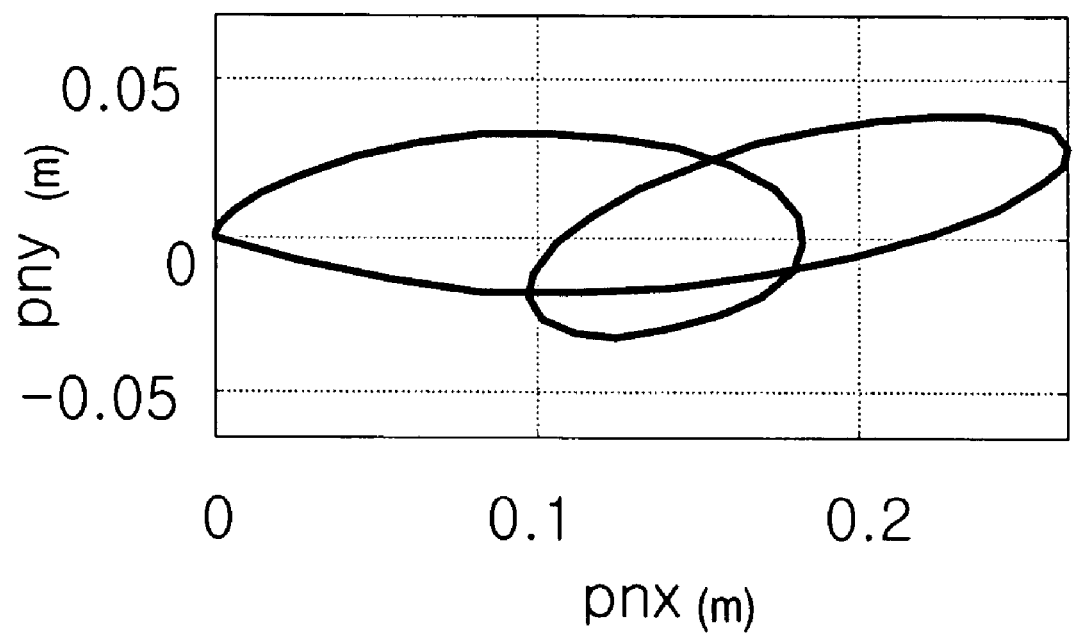

Furthermore, FIG. 7E indicates the motion trajectory of spatial writing in the case where motion velocity is not corrected, and FIG. 7F indicates the motion trajectory of spatial writing in the case where motion velocity is corrected according to an exemplary embodiment of the present invention.

Figure 8A:
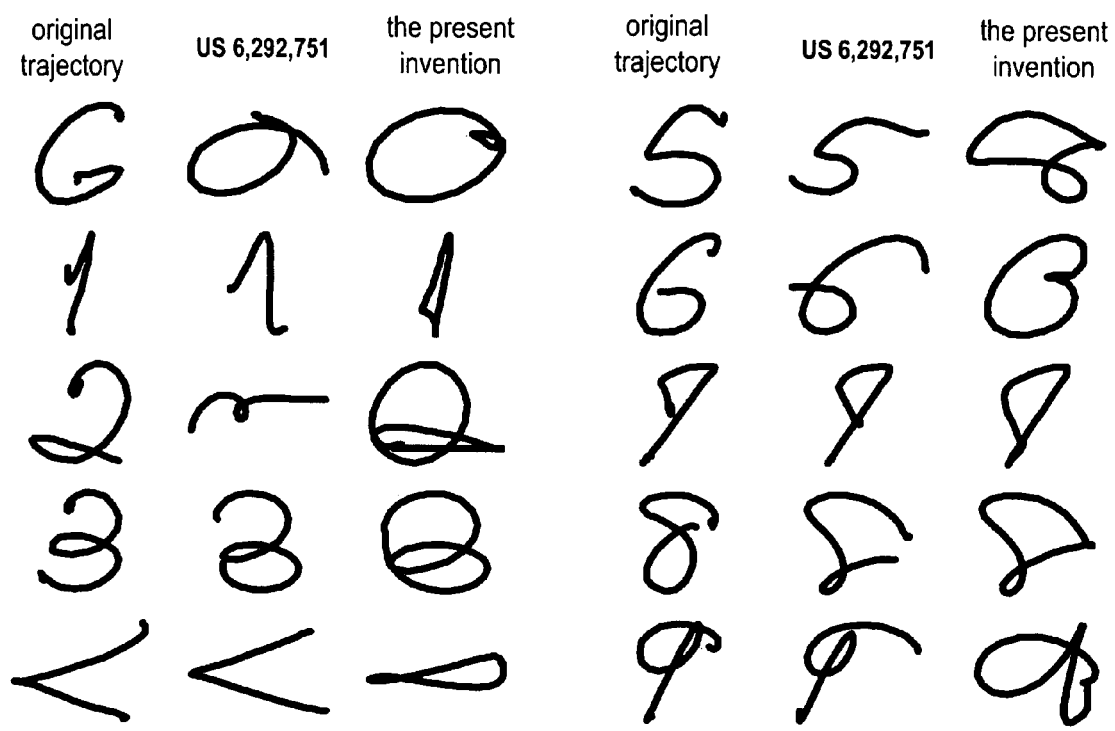
FIGS. 8A and 8B are graphs showing experimental results according to an exemplary embodiment of the present invention when a pause does occur before and after a spatial writing operation.
Figures 8B, 9A:
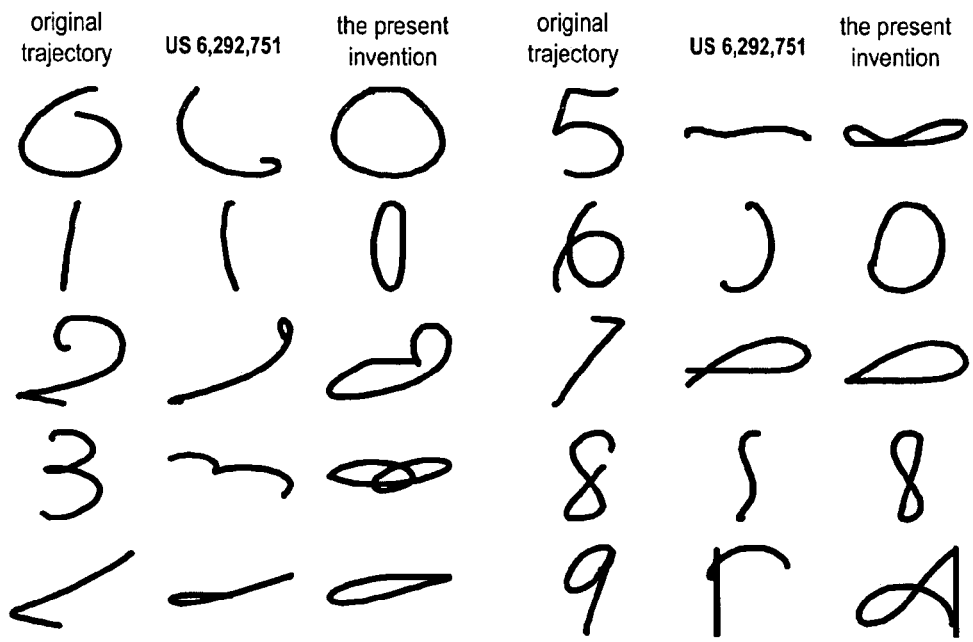
FIGS. 9A and 9B are graphs showing experimental results according to an exemplary embodiment of the present invention when no pause occurs before or after a spatial writing operation.

FIGS. 8A and 8B are graphs showing experimental results according to an exemplary embodiment of the present invention when a pause does occur before or after a spatial writing operation.

FIG. 8A shows Arabic numerals, which are written in a space by a user, and the results of the comparison of the motion trajectories of spatial writing based on the method disclosed in U.S. Pat. No. 6,292,751 with the motion trajectories of special writing based on the method according to an exemplary embodiment of the present invention. Furthermore, FIG. 8B shows the rate of recognition of what the user has written in a space from the motion trajectories shown in FIG. 8A.

Figures 9B, 10:
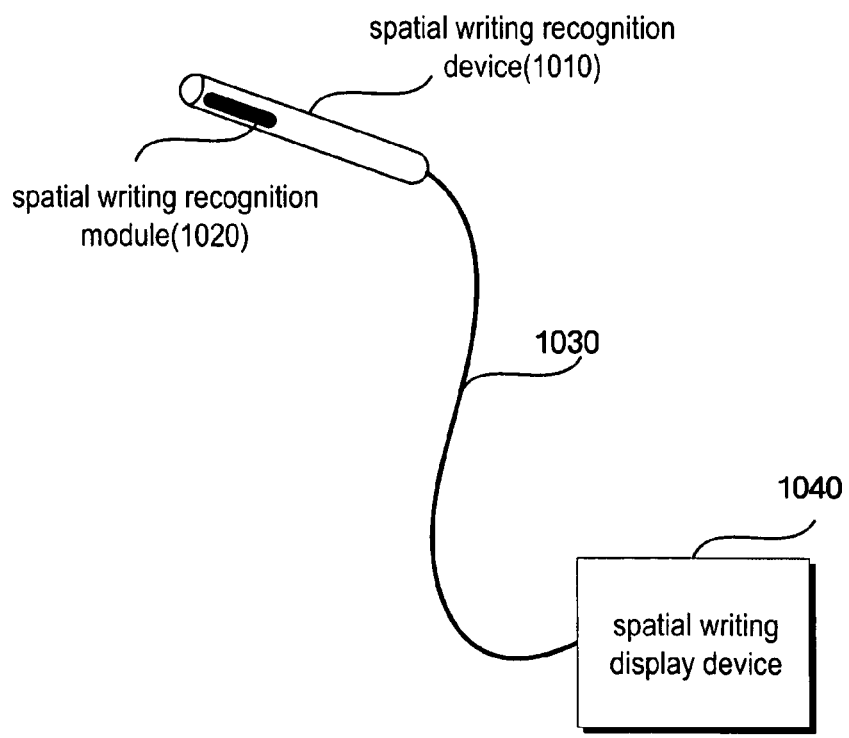
FIG. 10 is a diagram illustrating a system in which the apparatus for recognizing spatial writing according to an exemplary embodiment of the present invention is applied.

FIGS. 9A and 9B are graphs showing experimental results according to an exemplary embodiment of the present invention when no pause occurs before or after a spatial writing operation. According to an exemplary embodiment of the present invention, a start position and an end position of a motion trajectory may be obtained, for instance, using a button which is mounted on a writing instrument. For example, the position of the writing instument at the time when the button is pressed may become the start position of the motion trajectory and the position of the writing instrument at the time when the button is released may become the end position of the motion trajectory. In this example, the period during which the button is pressed may be deemed as the period during which to execute spatial writing.

FIG. 9A shows Arabic numerals, which are written in a space by the user, and the results of comparison of motion trajectories of spatial writing based on the method disclosed in U.S. Pat. No. 6,292,751 with motion trajectories of special writing based on the method according to an exemplary embodiment of the present invention. Furthermore, FIG. 9B shows the rate of recognition of what the user has written in a space from the motion trajectories shown in FIG. 9A.

When the result in FIG. 9B is compared with the result in FIG. 8B, it can be seen that the recognition rate of U.S. Pat. No. 6,292,751 decreases remarkably in the case where no pause occurs, but the recognition rate according to an exemplary embodiment of the present invention remains almost as high as the case where a pause occurs even though there is no pause.

FIG. 10 is a diagram illustrating a system in which an apparatus for recognizing spatial writing according to an exemplary embodiment of the present invention is applied. The system includes a spatial writing recognition device 1010 for performing spatial writing, a spatial writing display device 1040 for showing a user recognized spatial writing, and a connection medium 1030 for connecting the spatial writing recognition device 1010 with the spatial writing display device 1040.

The spatial writing recognition device 1010 has a pen shape, and is provided with a spatial writing recognition module 1020 for actually recognizing a user's spatial writing. The spatial writing recognition module 1020 is described in detail below with reference to FIG. 11.

When a user conducts spatial writing using the spatial writing recognition device 1010, the spatial writing recognition device 1010 recognizes the user's spatial writing, and transfers recognition results to the spatial writing display device 1040 through the connection medium 1030.

The spatial writing display device 1040 informs the user of the recognition results received from the spatial writing recognition device 1010. For example, a visual method using images or an audible method using sounds may be used. Examples of the spatial writing display device 1040 include, but are not limited to, various display devices or speakers.

Figure 11:
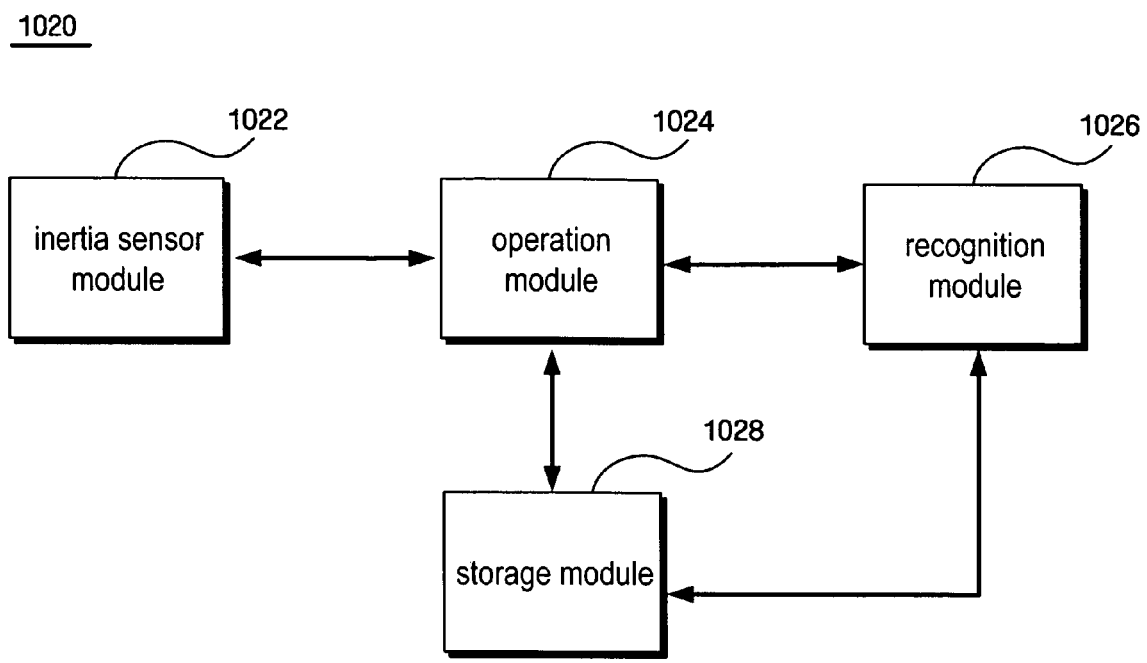
FIG. 11 is a block diagram showing the construction of a spatial writing recognition module according to an exemplary embodiment of the present invention.

FIG. 11 is a block diagram showing the construction of a spatial writing recognition module according to an exemplary embodiment of the present invention. The spatial writing recognition module 1020 includes an inertia sensor module 1022, an operation module 1024, a recognition module 1026, and a storage module 1028.

The term "module," as used herein, refers to, but is not limited to, a software or hardware component, such as a Field Programmable Gate Array (FPGA) or an Application Specific Integrated Circuit (ASIC), which performs certain tasks. A module may advantageously be configured to reside on the addressable storage medium and may be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality may be provided by the components and modules may be combined into fewer components and modules or may be further separated into additional components and modules.

The operations of respective modules constituting the spatial writing recognition module 1020 are described below.

The inertia sensor module 1022, which is a module for measuring the angular velocity and acceleration of the spatial writing recognition device 1010 while it is in motion, transfers a measured angular velocity and a measured acceleration to the operation module 1024. Furthermore, the storage module 1028 stores operation methods and operation parameters for performing operations based on the above-described Equations. Furthermore, the storage module 1028 stores pattern information about the motion trajectories of spatial writing for various characters or numerals.

The operation module 1024 performs a function of tracing the motion trajectory of spatial writing using information about the angular velocity and the acceleration received from the inertia sensor module 1022, and using various information that is stored in the storage module 1024, based on the method shown in FIG. 6. Furthermore, the recognition module 1026 recognizes what the user writes in a space by comparing the motion trajectory of the spatial writing traced by the operation module 1024 with the pattern information about motion trajectory patterns stored in the storage module 1028. The recognition module 1026 may transfer recognition results to the spatial writing display device 1040 through the connection medium 1030, as shown in FIG. 10.

In accordance with exemplary embodiments of the present invention, the rate of recognition of spatial writing can be improved, and the usability thereof can also be improved because a pause is not necessary.

Although exemplary embodiments of the present invention have been disclosed for illustrative purposes, those skilled in the art will appreciate that various modifications, additions and substitutions are possible with respect to the exemplary embodiments of the invention, without departing from the scope and spirit of the embodiments of the invention as defined in the following Claims.

What is claimed is:

1. A method for recognizing spatial writing by a spatial writing recognition device, the method comprising:

measuring, by the spatial writing recognition device, an acceleration of a spatial writing device for performing spatial writing;

calculating, by the spatial writing recognition device, a velocity of the spatial writing device using the measured acceleration;

correcting, by the spatial writing recognition device, the calculated velocity by limiting a positional relationship between predetermined points comprising a motion trajectory of the spatial writing device;

tracing, by the spatial writing recognition device, the motion trajectory of the spatial writing device using the corrected motion velocity; and recognizing, by the spatial writing recognition device, a traced motion trajectory wherein the limiting of the positional relationship between the predetermined points comprises causing a start point and an end point of the motion trajectory of the spatial writing device to coincide with each other.

2. The method as set forth in claim 1, wherein the calculated velocity $v^c(t)$ is expressed by $v^c(t)=v(t)-\alpha t$ for a predetermined $\alpha$, wherein $\alpha$ is calculated from the expression $$\alpha = \frac{\int_{t_1}^{t_2} v(t)\,dt}{\int_{t_1}^{t_2} t\,dt},$$

wherein $t_1$ indicates a time at the start point of the motion trajectory of the spatial writing device, and wherein $t_2$ indicates a time at the end point of the motion trajectory of the spatial writing device.

3. A method for recognizing spatial writing by a spatial writing recognition device, the method comprising:

measuring, by the spatial writing recognition device, an acceleration of a spatial writing device for performing spatial writing;

calculating, by the spatial writing recognition device, a velocity of the spatial writing device using the measured acceleration;

correcting, by the spatial writing recognition device, the calculated velocity by limiting a positional relationship between predetermined points comprising a motion trajectory of the spatial writing device;

tracing, by the spatial writing recognition device, the motion trajectory of the spatial writing device using the corrected motion velocity; and recognizing, by the spatial writing recognition device, a traced motion trajectory, wherein the limiting of the positional relationship between the predetermined points comprises setting a distance between a first point of the motion trajectory of the spatial writing device at a time $t_1$ and a second point of the motion trajectory of the spatial writing device at a time $t_2$ to a constant value $\gamma$.

4. The method as set forth in claim 3, wherein the calculated velocity $v^c(t)$ is expressed by $v^c(t)=v(t)-\alpha t-\beta$ for a predetermined $\alpha$ and a predetermined $\beta$, wherein $\alpha$ is determined by $$\alpha = \frac{\int_{t_1}^{t_2} \{v(t)-\beta\}\,dt - \gamma}{\int_{t_1}^{t_2} t\,dt}$$

for a predetermined $\beta$, or wherein $\beta$ is determined by $$\beta = \frac{\int_{t_1}^{t_2} \{v(t)-\alpha t\}\,dt - \gamma}{t_2 - t_1}$$

for a predetermined $\alpha$ and a predetermined $\beta$.

5. A computer-readable recording medium storing instructions that instructs a computer to execute a method comprising:

measuring an acceleration of a spatial writing device performing spatial writing;

calculating a velocity of the spatial writing device using the measured acceleration;

correcting the calculated velocity by limiting a positional relationship between predetermined points comprising a motion trajectory of the spatial writing device;

tracing the motion trajectory of the spatial writing device using the corrected motion velocity; and recognizing a traced motion trajectory, wherein the limiting of the positional relationship between the predetermined points comprises causing a start point and an end point of the motion trajectory of the spatial writing device to coincide with each other.

6. An apparatus for recognizing spatial writing, the apparatus comprising:

a spatial writing recognition module, wherein the spatial writing recognition module comprises:

an inertia sensor module which is configured to measure an acceleration of a spatial writing device;

a storage module which stores predetermined operation information and parameters for tracing a motion trajectory of the spatial writing device, and pattern information about motion trajectories of the spatial writing device;

an operation module which calculates a velocity of the spatial writing device from the measured acceleration using the operation information and the parameters, corrects the calculated velocity by limiting a positional relationship between predetermined points comprising the motion trajectory of the spatial writing device, and traces the motion trajectory of the spatial writing device using the corrected velocity; and a recognition module which recognizes the spatial writing by comparing the motion trajectory of the spatial writing device that is traced by the operation module with the pattern information that is stored in the storage module, wherein the operation module limits the positional relationship between the predetermined points by causing a start point and an end point of the motion trajectory of the spatial writing device to coincide with each other.

7. The apparatus as set forth in claim 6, wherein the calculated velocity $v^c(t)$ is expressed by $v^c(t)=v(t)-\alpha t$ for a predetermined $\alpha$, wherein $\alpha$ is calculated from the expression $$\alpha = \frac{\int_{t_1}^{t_2} v(t)\,dt}{\int_{t_1}^{t_2} t\,dt},$$

wherein $t_1$ indicates a time at the start point of the motion trajectory of the spatial writing device; and wherein $t_2$ indicates a time at the end point of the motion trajectory of the spatial writing device.

8. An apparatus for recognizing spatial writing, the apparatus comprising:

a spatial writing recognition module, wherein the spatial writing recognition module comprises:

an inertia sensor module which is configured to measure an acceleration of a spatial writing device;

a storage module which stores predetermined operation information and parameters for tracing a motion trajectory of the spatial writing device, and pattern information about motion trajectories of the spatial writing device;

an operation module which calculates a velocity of the spatial writing device from the measured acceleration using the operation information and the parameters, corrects the calculated velocity by limiting a positional relationship between predetermined points comprising the motion trajectory of the spatial writing device, and traces the motion trajectory of the spatial writing device using the corrected velocity; and a recognition module which recognizes the spatial writing by comparing the motion trajectory of the spatial writing device that is traced by the operation module with the pattern information that is stored in the storage module, wherein the operation module limits the positional relationship between the predetermined points by setting a distance between a first point of the motion trajectory of the spatial writing device at a time $t_1$ and a second point of the motion trajectory of the spatial writing device at time $t_2$ to a constant value $\gamma$.

9. The apparatus as set forth in claim 8, wherein the calculated motion velocity $v^c(t)$ is expressed by $v^c(t)=v(t)-\alpha t-\beta$ for a predetermined $\alpha$ and a predetermined $\beta$, wherein $\alpha$ is determined by $$\alpha = \frac{\int_{t_1}^{t_2} \{v(t) - \beta\} dt - \gamma}{\int_{t_1}^{t_2} t\, dt}$$

for a predetermined $\beta$, or wherein $\beta$ is determined by $$\beta = \frac{\int_{t_1}^{t_2} \{v(t) - \alpha t\} dt - \gamma}{t_2 - t_1}$$

for a predetermined $\alpha$ and a predetermined $\beta$.

10. A computer-readable recording medium storing instructions that instructs a computer to execute a method comprising:

measuring an acceleration of a spatial writing device performing spatial writing;

calculating a velocity of the spatial writing device using the measured acceleration;

correcting the calculated velocity by limiting a positional relationship between predetermined points comprising a motion trajectory of the spatial writing device;

tracing the motion trajectory of the spatial writing device using the corrected motion velocity; and recognizing a traced motion trajectory, wherein the limiting of the positional relationship between the predetermined points comprises setting a distance between a first point of the motion trajectory of the spatial writing device at a time $t_1$ and a second point of the motion trajectory of the spatial writing device at a time $t_2$ to a constant value $\gamma$.

* * * * *